(12) United States Patent
Ravindranath et al.

(10) Patent No.: US 11,487,533 B2
(45) Date of Patent: Nov. 1, 2022

(54) METHOD AND SYSTEM FOR INFERENCING LOGIC OUT OF AN APPLICATION SOURCE

(71) Applicant: Tata Consultancy Services Limited, Mumbai (IN)

(72) Inventors: Yogananda Ravindranath, Chennai (IN); Tamildurai Mehalingam, Chennai (IN); Aditya Thuruvas Senthil, Chennai (IN); Reshinth Gnana Adithyan, Chennai (IN); Shrayan Banerjee, Chennai (IN); Balakrishnan Venkatanarayanan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 119 days.

(21) Appl. No.: 17/205,455

(22) Filed: Mar. 18, 2021

(65) Prior Publication Data

US 2022/0222069 A1 Jul. 14, 2022

(30) Foreign Application Priority Data

Jan. 13, 2021 (IN) .............................. 202121001729

(51) Int. Cl.
*G06F 9/44* (2018.01)
*G06F 8/73* (2018.01)
(Continued)

(52) U.S. Cl.
CPC ................. *G06F 8/73* (2013.01); *G06F 8/75* (2013.01); *G06N 5/04* (2013.01); *G06N 20/00* (2019.01)

(58) Field of Classification Search
None
See application file for complete search history.

(56) References Cited

U.S. PATENT DOCUMENTS

2003/0083900 A1 5/2003 Khriss et al.
2004/0031015 A1 2/2004 Ben-Romdhane et al.
(Continued)

FOREIGN PATENT DOCUMENTS

CN 108062587 A 5/2018
JP 2019-79312 A 5/2019

*Primary Examiner* — Insun Kang
(74) *Attorney, Agent, or Firm* — Finnegan, Henderson, Farabow, Garrett & Dunner LLP (57) ABSTRACT

The application source code generally does not have any uniformity, defined executional sequence or documented information on the underlying complexity. It varies based on the requirement, domain and from each developer to developer. The slightest mistake in analyzing/modifying it will have a huge impact for the existing functionalities and interfacing applications. A method and system for inferencing code logic out of an application source code has been provided. This starts with the conversion of the raw form of code into logically linked blocks. These logical blocks in-turn represent standard meaningful representation of the code logic and are processed into vectors. Further, the processed vectors are fed into pre-trained machine learning models from which the code logic is predicted. Further the system and method can also be extended to various other applications in application maintenance, aiding the SME, inducting a new resource, documentation etc.

11 Claims, 7 Drawing Sheets

(51) Int. Cl.
   *G06N 20/00* (2019.01)
   *G06F 8/75* (2018.01)
   *G06N 5/04* (2006.01)

(56) References Cited

U.S. PATENT DOCUMENTS

| | | | |
|---|---|---|---|
| 2019/0156229 A1 | 5/2019 | Tee et al. | |
| 2019/0324731 A1* | 10/2019 | Zhou | G06N 5/003 |
| 2020/0133662 A1* | 4/2020 | Smith | G06F 8/73 |
| 2020/0327118 A1* | 10/2020 | Ahmed | G06F 8/433 |
| 2020/0401386 A1* | 12/2020 | Punathil | G06F 8/433 |
| 2022/0214863 A1* | 7/2022 | Clement | G06N 3/0445 |

* cited by examiner

METHOD AND SYSTEM FOR INFERENCING LOGIC OUT OF AN APPLICATION SOURCE

PRIORITY CLAIM

This U.S. patent application claims priority under 35 U.S.C. § 119 to: Indian Patent Application No. 202121001729, filed on 13 Jan. 2021. The entire contents of the aforementioned application are incorporated herein by reference.

TECHNICAL FIELD

The disclosure herein generally relates to field of source code analysis, and, more particularly, to a method and system for inferencing logic out of an application source code.

BACKGROUND

Code analysis has been important for coders to get important information out of the source code. Code analysis can be done using the field of machine learning, but it is tricky and complex. This is especially due to the complexity of the various ways in which a code can be written to define a particular requirement. The 'grammar' does help in understanding the syntax but fails to help much due to the usage of variables. Though variables give a huge amount of information, the naming conventions and purposes differ from coder to coder, Hence, to tap the full information of code along with the business context, understanding the different coding styles and the variables used in a sensible manner is indispensable.

With the wave of modernization taking over corporates, legacy coding languages like Common Business-Oriented Language (COBOL) has been losing its coder-base and hence become difficult to maintain. In an attempt to help users from such a situation, code analyzers can help in pointing out the functionalities that has been carried out in the code even without the user having syntactical knowledge about the language.

Few manual techniques are available in the art but manual intervention are error prone and increases the time taken in the Modernization journey.

SUMMARY

Embodiments of the present disclosure present technological improvements as solutions to one or more of the above-mentioned technical problems recognized by the inventors in conventional systems. For example, in one embodiment, a system for inferencing logic out of an application source code has been provided. The system comprises an input/output interface, one or more hardware processors and a memory. The input/output interface provides, the application source code as an input. The memory in communication with the one or more hardware processors, wherein the one or more first hardware processors are configured to execute programmed instructions stored in the one or more first memories, to: parse the application source code using parsers, wherein the parsing results in generation of a code language independent repository, wherein the code language independent repository comprising information about the application source code; link the information related to each other present in the repository to extract a plurality of logical blocks, wherein the plurality of logical blocks comprising a plurality of leaf nodes and sequential distances between each of the plurality of leaf nodes; create a plurality of capsules for each pair of the plurality of leaf nodes from the plurality of logical blocks based on a scope of the leaf nodes and sequential distance between the leaf nodes of each leaf node couple; calculate an optimized set of hyper parameters of a machine learning model using an optimizer model; train the machine learning model using the calculated hyper parameters; predict the functionality of the plurality of logical blocks by vectorizing the plurality of logical blocks using the plurality of capsules and the trained machine learning model; and merge the predicted functionality with a plurality of external inputs to determine code logic inference of the application source code, wherein the plurality of external inputs are taken from one or more external learning models.

In another aspect, a method for inferencing logic out of an application source code has been provided. Initially, the application source code is provided as an input. The application source code is then parsed using parsers, wherein the parsing results in generation of a code language independent repository, wherein the code language independent repository comprising information about the application source code. In the next step, the information related to each other present in the repository is linked to extract a plurality of logical blocks, wherein the plurality of logical blocks comprising a plurality of leaf nodes and sequential distances between each of the plurality of leaf nodes. Further, a plurality of capsules is created for each pair of the plurality of leaf nodes from the plurality of logical blocks based on a scope of the leaf nodes and sequential distance between the leaf nodes of each leaf node couple. In the next step, an optimized set of hyper parameters is calculated of a machine learning model using an optimizer model. Further, the machine learning model is trained using the calculated hyper parameters. The functionality of the plurality of logical blocks is then predicted by vectorizing the plurality of logical blocks using the plurality of capsules and the trained machine learning model. And finally, the predicted functionality is merged with a plurality of external inputs to determine code logic inference of the application source code, wherein the plurality of external inputs are taken from one or more external learning models.

In yet another aspect, one or more non-transitory machine readable information storage mediums comprising one or more instructions which when executed by one or more hardware processors cause inferencing logic out of an application source code. Initially, the application source code is provided as an input. The application source code is then parsed using parsers, wherein the parsing results in generation of a code language independent repository, wherein the code language independent repository comprising information about the application source code. In the next step, the information related to each other present in the repository is linked to extract a plurality of logical blocks, wherein the plurality of logical blocks comprising a plurality of leaf nodes and sequential distances between each of the plurality of leaf nodes. Further, a plurality of capsules is created for each pair of the plurality of leaf nodes from the plurality of logical blocks based on a scope of the leaf nodes and sequential distance between the leaf nodes of each leaf node couple. In the next step, an optimized set of hyper parameters is calculated of a machine learning model using an optimizer model. Further, the machine learning model is trained using the calculated hyper parameters. The functionality of the plurality of logical blocks is then predicted by vectorizing the plurality of logical blocks using the plurality of capsules and the trained machine learning model. And finally, the predicted functionality is merged with a plurality of external inputs to determine code logic inference of the application source code, wherein the plurality of external inputs are taken from one or more external learning models.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There are few techniques available in the art which are being used for inferencing some kind of logic out of the source code. Modernization decision is often influenced by the biggest risk of its dependency on the existing subject matter experts (SME's). In cases of outsourcing, even the availability of technical SME's experienced in legacy technologies is decreasing day by day. Thus the ability to understand the knowledge from SME about an application and successfully transform it is also gradually decreasing. Further, there is no existing automation solution that provides the technical, business and domain context.

In all the above scenarios, knowledge about the existing application and ensuring that the correct inputs are provided during the initial stages of analysis becomes essential. This reduces the enterprises ability to quickly transform themselves and adapt to the growing business needs.

The present disclosure provides a machine learning based automated code logic inference technique which extracts the required information from the single source of truth—"application source code". This starts with the analysis of the source code and breaking the code into logical blocks. Further the logical blocks are processed into vectors and fed into pre trained models built based on the experience in transformation.

The pre-trained models already have a knowledge about similar applications domain. This enables reduced dependency on the SME. Further the system and method can also be extended to various other applications in application maintenance, aiding the SME, inducting a new resource, documentation etc.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

Figure 1:
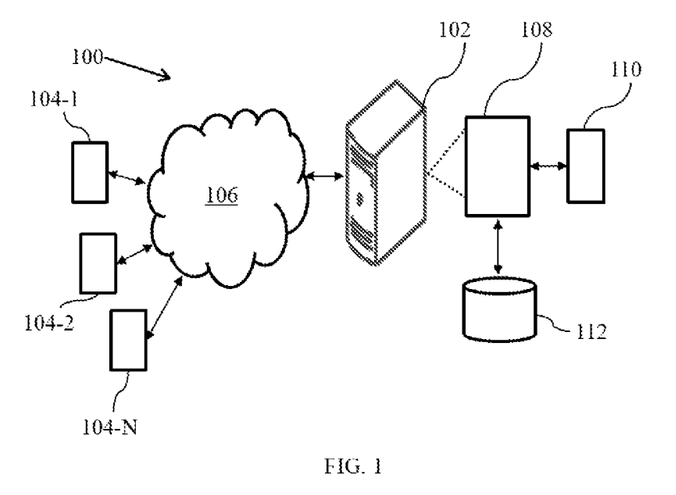
FIG. 1 illustrates a network diagram of a system for inferencing logic out of an application source code according to some embodiments of the present disclosure.

FIG. 1 illustrates a network diagram of a system 100 for inferencing logic out of an application source code in accordance with few embodiments of the present disclosure. The present disclosure provides a system and method to convert code into meaningful numerical representations through deep learning neural networks which further helps a user categorize the functionalities involved in the code. This vectorization technique strives to bring in the maximum scope of context in the code, and variable information to help the model analyze a code accurately.

Although the present disclosure is explained considering that the system 100 is implemented on a server, it may also be present elsewhere such as a local machine. It may be understood that the system 100 comprises one or more computing devices 102 such as a laptop computer, a desktop computer, a notebook, a workstation, a cloud-based computing environment and the like. It will be understood that the system 100 may be accessed through one or more input/output interfaces or user interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

Figure 2:
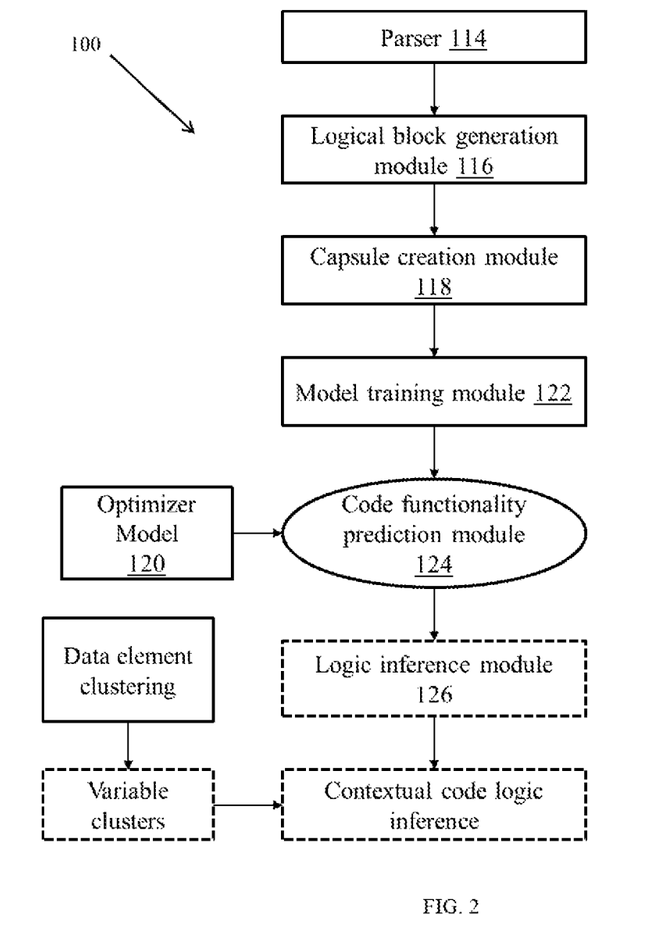
FIG. 2 shows a schematic block diagram of the system of FIG. 1 for inferencing logic out of the application source code according to some embodiments of the present disclosure.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprising a plurality of modules for performing various functions as shown in FIG. 2. The plurality of modules comprising a parser 114, a logical block generation module 116, a capsule creation module 118, a model optimizer 120, a model training module 122, a functionality prediction module 124 and logic inference module 126 as shown in the block diagram of FIG. 2.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail. According to an embodiment of the disclosure, the memory 110 further comprises a plurality of modules. The plurality of modules are configured to perform various functions.

Figure 3:
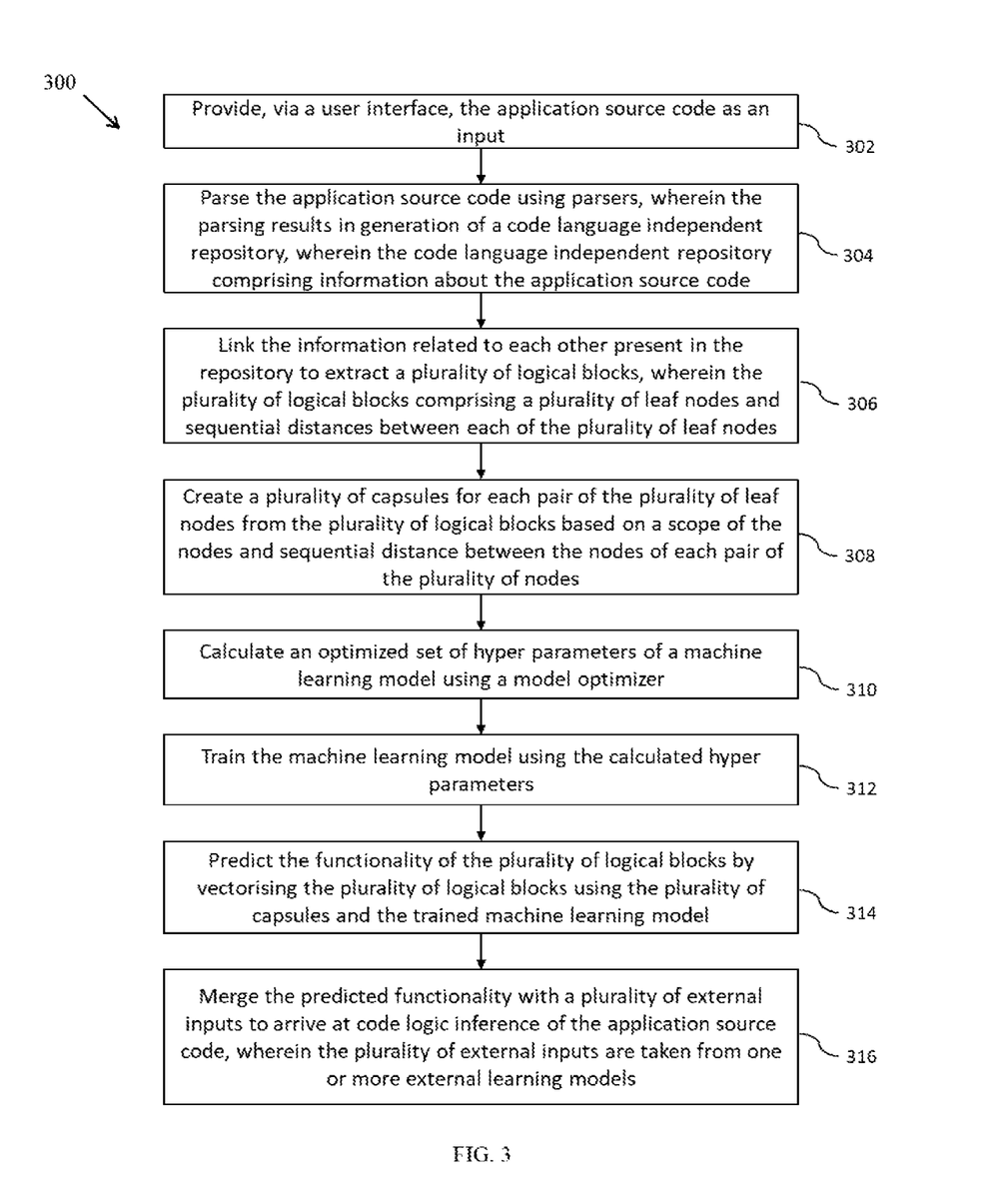
FIG. 3 illustrates a flowchart of a method for inferencing logic out of the application source code according to some embodiments of the present disclosure.

In operation, a flowchart 300 for inferencing logic out of the application source code is shown in FIG. 3 in accordance with an embodiment of the present disclosure. Initially at step 302, the application source code is provided as an input via the user interface 104.

At step 304, the application source code is parsed using the parsers 114. The parsing results in generation of a code language independent repository. The code language independent repository comprising information about the application source code. The application source code is fed into technology specific parsers which can understand the syntax of the application source code. The parsers scan through each and every character in the code and generates a language independent repository. This repository has the complete information about the source code including its flow, dependencies and structural aspects.

Figure 4:
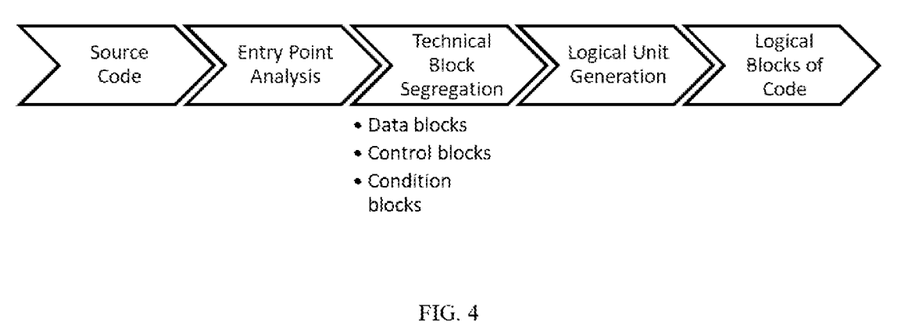
FIG. 4 is a block diagram illustrating a method for generating plurality of logical blocks according to some embodiments of the present disclosure.

Further at step 306, the information related to each other present in the repository is linked together to extract a plurality of logical blocks using the logical block generation module 116 as shown in FIG. 4. As an output of the previous step 304, the repository with the complete blueprint of the source code is available. It is essential to link the items within the generated repository and start extracting out blocks based on logical relationships. The plurality of logical blocks comprises a plurality of leaf nodes, its corresponding scope till the root node of the block and sequential distances between each nodes of the plurality of leaf nodes.

The logical block generation module 116 categorizes the source code into logical blocks from which the code logic is predicted. The application source code in its raw form generally does not have any uniformity or information on the underlying complexity and the slightest mistake in analyzing/modifying it may have a huge impact for the existing and interfacing applications. The logical block generation module 116 understands the syntax and the impact of a statement and groups the statements based on the logical linkage into data blocks, control blocks and condition blocks.

In general flow based representation i tree based representation they have a singular molecular block definition, wherein every block can have any type of the statement. In the present disclosure the blocks are divided into three different types.

Data block: The code functionality generally begins with receiving the input to be processed. Once the input is received, it is prepared for processing. All the code statements which are involved in receiving the input, receiving the input into local variables in the code, preparing the inputs for processing etc. are grouped together as data blocks. These data blocks will further feed in the information to different type of evaluation, comparison and computations downstream in the code flow.

Control block: Understanding of these control transferring statements and the decoding the logical execution is essential to create logical blocks of code. Control transferred through these statements can be permanent or temporary transfer and maintaining the point of entry/point of return during the control transfer is essential. These control transferring statements along with the information about the point of entry/point of return forms the control blocks.

Condition Block: The condition block refers to statements/blocks in the code containing the conditional decision-making points. The action blocks that are executed conditionally and performed as a part of the condition success/failure also form a part of these blocks. The logical block generation module 116 organizes these blocks that are segregated as the data blocks, the condition blocks and the control blocks by decoding the execution sequence and generated logical units i logical blocks of code. The logical block generation module 116 also has a defined optimal threshold limit. This threshold limit will help the module decide the size of the logical block. This limit will also internally govern the decision whether the control block should be expanded in a logical unit that is created/left unexpanded. The need for source code in its raw form is discarded from this step and the logical blocks of code generated from the logical block generation module will be used for further processing.

Defining these specific block types increase the hierarchical relationships while capturing the syntactical aspect of the statements in a block. For example, statistically patterns of code blocks were seen, wherein a MOVE statement under a condition block is very much varied from a MOVE Statement under a data block. This clear demarcation also helps in the process of capturing the semantics while traversing. Imagine two variables present under two blocks (different ones) the logical block segregation would be an additional level of information which will be useful in the process of capturing the semantic relation between blocks.

Figure 5:
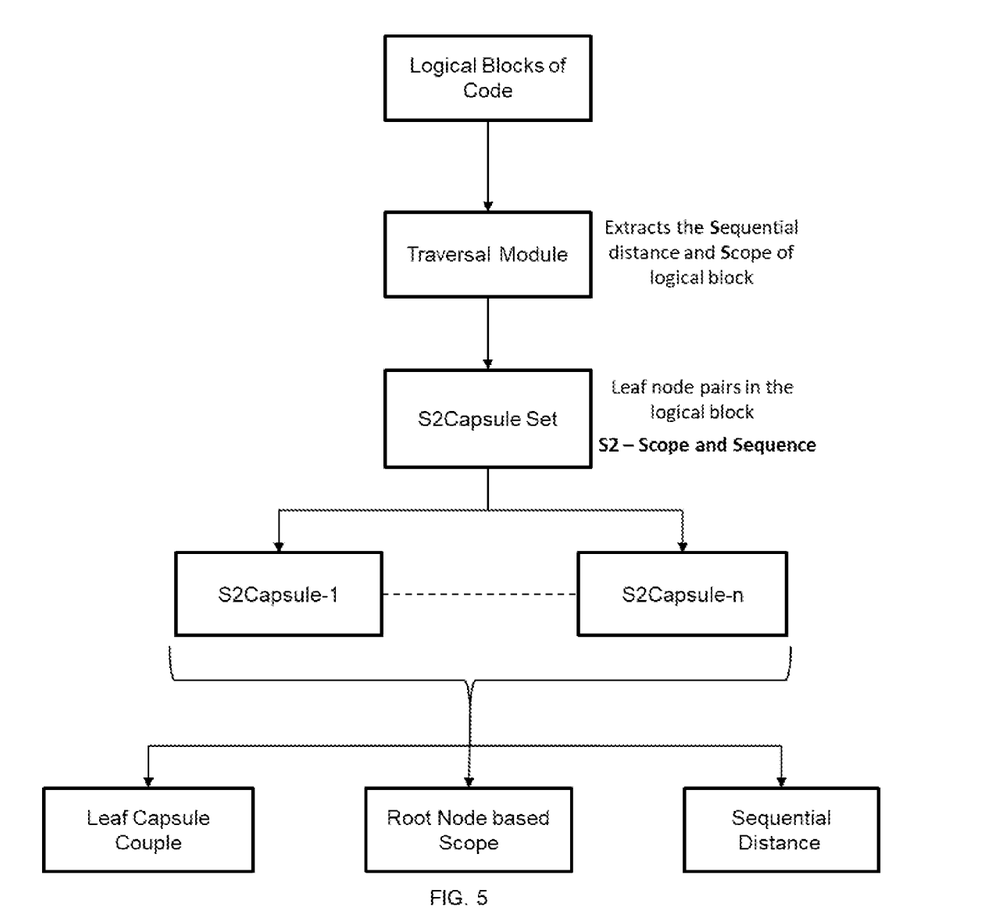
FIG. 5 is a block diagram illustrating a method of creating a plurality of capsules according to some embodiment of the present disclosure.

Once a logical block is given in form of a hierarchical structure, the capsule creation module 118 converts the hierarchical structure into the consumable vectors for the model. There are two types of nodes in the structure. First, leaf node—nodes with no children. Second, non-leaf node—nodes with at least one child.

At step 308, a plurality of capsules is created using the capsule creation module 118. The plurality of capsules is created for each pair of the plurality of leaf nodes from the plurality of logical blocks based on a scope of the leaf nodes and sequential distance between the leaf nodes of each pair of the plurality of leaf nodes. The plurality of capsules further comprising one or more of a plurality of leaf node sub-capsules, a plurality of path sub-capsules, or a plurality of sequential distance sub-capsules.

A schematic block diagram of the capsule creation module 118 is shown in FIG. 5. It receives the plurality of logical blocks as input. Further, it identifies leaf node couples and root node based scope. Further, the capsule creation module 118 also identifies the sequential distances between each of the leaf node couples. Thus, all the leaf nodes within each of the logical block in the code are taken and a capsule is created for each pair based on its unique identity in the block, the scope and sequential distances.

According to an embodiment of the disclosure, the capsule creation module 118 also configured to convert the hierarchical structure into capsules, which is of the following types:

1) Leaf capsule couple—Pair of all possible leaf nodes in the hierarchical structure.
2) Root node based scope—Scope traversal between the super parent and the given leaf node which captures the scope of the given leaf node present in each part of the hierarchical structure. This is one of the important design choice as this differentiates same leaf node occurring in two different places of the block.
3) Sequential distance—Sequential distance in this context is the executional path traced between two leaf nodes in the leaf capsule couple. The path is computed between the non-leaf nodes by first getting to the common parent and listing the sequence of all the immediate children of the common parent. This sequence in turn represents the distance between the non-leaf nodes. This is another important design decision as this provides the paths with an additional control flow context.
4) S2 Capsule—An S2 capsule contains all the above-mentioned parameters which is the processed vector representation of a given hierarchical Structure of a Block. It contains,

[[Leaf Node-1] [Scope of Leaf Node-1] [Sequential Distance] [Scope of Leaf Node-2] [Leaf Node-2]]

Figure 7:
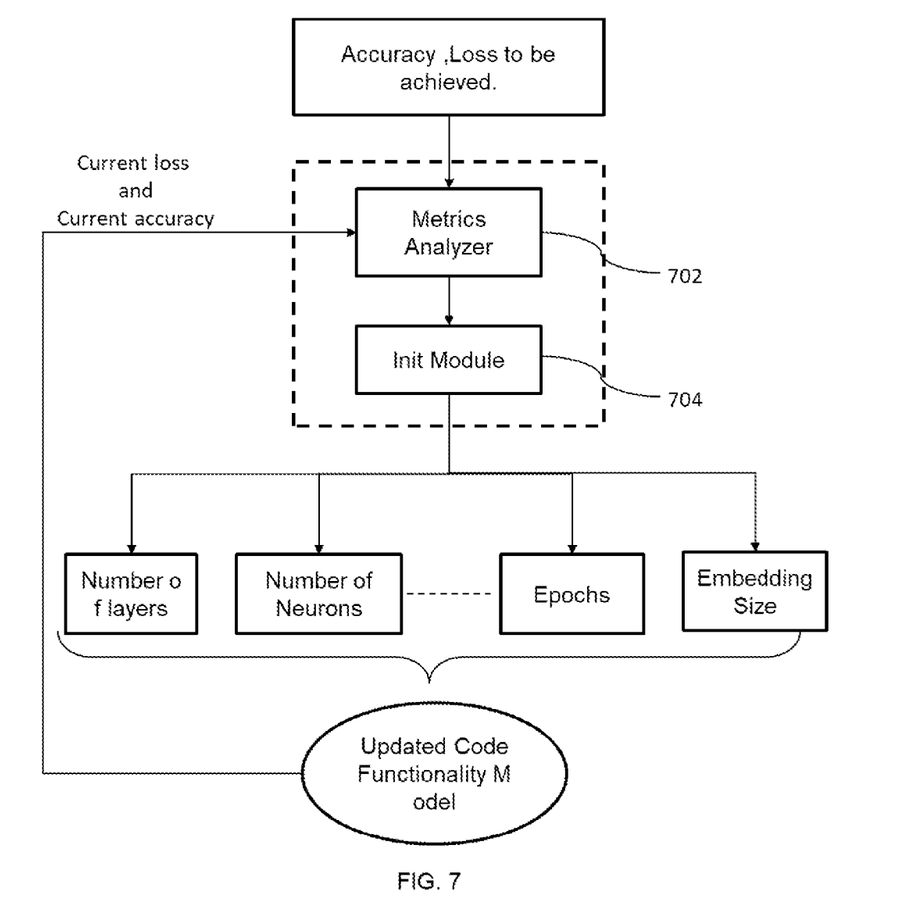
FIG. 7 is a block diagram illustrating a model optimizer of the system of FIG. 1 according to some embodiment of the present disclosure.

At step 310, an optimized set of hyper parameters of a machine learning model is calculated using the model optimizer 120 as shown in schematic diagram of FIG. 7. At step 312, the machine learning model is trained using the calculated hyper parameters using the model training module 122. The accuracy of the results of a neural network model is dependent on the tunable hyper parameters assigned to the model. These tunable hyper parameters of the code logic inference model have to be iteratively tuned for the training data given to the code logic inference model. Even a small change or addition in the training data may warrant a huge effort to achieve the same or similar output precision. The present disclosure is utilizing the model optimizer 120 which helps the model to learn from any new/additional labelled training data seamlessly. These hyper parameters are automatically decided by the model optimizer based on the accuracy, loss and base model architecture.

The available deterministic approaches for hyper parameter optimization leverage the use of Bayesian optimization which tries to do a search on a space. Bayesian optimization is efficient in tuning few hyper-parameters but its efficiency degrades a lot when the search dimension increases too much, up to a point where it is on par with random search. This allows to leverage the usage neural network.

The approach provided in present disclosure is more accurate since all the parameters are generated from a Feed Forward Neural Network.

The most important advantage is in terms of privacy, the optimizer model doesn't scan through the dataset for fine-tuning. The process enumerated is an iterative, intuitive way of fine-tuning the parameters to do optimization. Model centric parameters such as number of layers, number of layer configuration etc. and training centric parameters such as number of epochs, batch size etc. are automatically generated and tuned based on the feedback. The much difficult task of reconfiguring the model without disturbing the base stature of the architecture is achieved through this.

According to an embodiment of the disclosure, the system 100 is utilizing a capsule creation and embedding approach that is different from existing vectorization approaches for source code. Existing Random walk-based algorithms generate vector representations of nodes in a graph. These frameworks learn low-dimensional representations for nodes in a graph through the use of random walks through a graph starting at a target node. Whereas in the present disclosure, the embedding is learnt for the syntactical path (Not node). The idea of random walk to structured walk (Single Path) is restricted between two leaf nodes, thereby capturing the semantics/syntax of a code block.

Other similar vectorization approaches have missed to capture the executional aspect of a given piece of Code and are hugely biased over the hashed variable set and often ends up with Out of Vocabulary problems when implemented in production. Whereas, a variable name agnostic approach has been introduced on capturing the representation of a given block with a limited vocabulary. The approach followed is carefully determined without the deterioration of semantics.

Another main addition in the capsule creation process is the sequential distance vector which is being used to capture the order or flow in which the execution happens. This adds enormous value in understanding the total block and helps in differentiating statements in different context in a more semantic manner. For example, PARA-1.
MOVE AMT-INPUT TO DEBIT-AMT.
COMPUTE DEBIT-AMT=DEBIT-AMT*0.9.
COMPUTE ACC-BALANCE=ACC-BALANCE−DEBIT AMT.
COMPUTE DEBIT-BAL-LIMIT=DEBIT-BAL-LIMIT−DEBIT-AMT.
DISPLAY DEBIT-BAL-LIMIT ACC-BALANCE.
PARA-2
MOVE AMT-INPUT TO DEBIT-AMT.
COMPUTE ACC-BALANCE=ACC-BALANCE−DEBIT-AMT.
COMPUTE DEBIT-AMT=DEBIT-AMT*0.9.
COMPUTE DEBIT-BAL-LIMIT=DEBIT-BAL-LIMIT−DEBIT-AMT.
DISPLAY DEBIT-BAL ACC-BALANCE.

Explanation: Both these PARA (PARA-1 and PARA-2) of code give different outputs though they consist of same statements in different order. The vectors generated for these paragraphs in existing works often give very similar or same vectors. But the existing approach takes the contextual placement into account with the help of the sequential distance vector and hence helps to capture the finer subtleties among source code blocks.

The capsule creation process is also unique in capturing the scope and linking that with the other sub-capsules. This Scope based addition contributes in the process of differentiating same leaf node present in different parts of the structure of a block. Addition of executional flow of the statement clearly differentiates two leaf nodes which are closer in the execution and the leaf nodes which are farther in the execution. To do this, the complete information until the root node of the logical block is captured. The root node and the depth of the scope is dependent on the logical block, unlike the existing works, which go just until the immediate common parent. This helps in retaining the contextual positions of the statements in the block and differentiate the statements, even though they might be the same exact statement repeated in different contexts. For example, PARA3.
IF FLAG =="1":
MOVE AC-BALANCE TO NEW-TBALANCE
IF AMOUNT NOT EQUALS ZEROES:
ADD AC-BALANCE TO AMOUNT GIVING NEW-TBALANCE
MOVE AC-BALANCE TO NEW-TBALANCE Explanation: In the above code logic of paragraph 3, consider the scope of path between AC-BALANCE (MOVE STATEMENT-1) and the NEW-TBALANCE (MOVE STATEMENT-1) and AC-BALANCE (MOVE-STATEMENT-2) and NEW-TBALANCE (MOVE-STATEMENT-2). The path traversed for these statements would be exact duplicates in other existing works whereas they are two different paths occurring in two different scopes in our work (under different IF conditions). This is a better method in capturing Semantics of a given code block.

Handling of source code variables is a tricky job due to the sheer variety in which they can be named, A conventional vocabulary and hash-map to each and every new variable often leads to huge memory consumption and sometimes even biased towards the variable name being used, though it should not. This same method also suffers from Out of Vocabulary problem wherein if it encounters a new variable name which was not a part of its training set, the model fails to accept and process the input.

Hence the present disclosure adapts a memory efficient way in handling these variables by using encoding techniques which assigns values relative to each new code block depending on its position of occurrence. This helps in maintaining the information of the variable, without disturbing the semantics nor is biasing the model towards what variable name is being used. This also solves the Out of Vocabulary problem since it doesn't depend on the variable name to assign a value but only on the position of its occurrence in a block.

For example, as shown in above PARA3 code example, in a conventional method, the variables AC-BALANCE NEW-TBALANCE might have any hash value associated with it ranging from a possibility of 0 to the maximum vocabulary size (which often-times is very big—depending on the training data used). But here, FLAG gets an encoding value of 1, AC-BALANCE as 2, NEW-TBALANCE as 3 and AMOUNT as 4. Hence it is limited to a specific number for each block (presently 100, which is decided based on, the optimum size of a logical block) and this surpasses the above discussed problems.

According to an embodiment of the disclosure as shown in FIG. 7, the optimizer model takes in the base model architecture, the desired loss, the desired accuracy to be achieved as the input. Given the current loss and the current accuracy, it starts to generate a specific combination of parameters which is sent back to the Code logic inference module. Once another set of loss and accuracy is obtained the gradient descent tries to intuitively modify the architecture in the given set of trials. The re-initialization happens in given set trials, best initialization is found out to be the best suited architecture for code logic Inference.

This can be explained with the help of an example as follows: Say initially there are 3 layers with 50 neurons each, the resultant accuracy of the neural network is 46%. Now when optimizer model gets 46% as the input accuracy, let's say it tries to put 2 layers with 30 neurons each resulting in an accuracy of 32%. Now, the optimizer model finds out the relationship between number of layers and accuracy. So it intuitively puts up number of layers more than 5, this iteratively happens until the desired accuracy is reached in the given set of trials.

According to an embodiment of the disclosure, the system 100 comprises a metrics analyser 702 and an init module 704. The metrics analyser 702 takes in the desired accuracy and the desired loss to be achieved and the current accuracy, loss of the model with the given set of parameters. The mentioned inputs are taken in, and suitable tunings for the optimizer model's weights are obtained by the process of back-propagation which is then sent to the init module 704. The init module 704 tunes the weights with respect to the gradients obtained from the metrics analyzer 702 and gives outputs in float values—which is rounded off to the nearest integer. These values are sent in as hyper-parameters of the code logic inference model. For a given set of Input, the maximum achievable accuracy is also determined by the optimizer model. Specification of the model optimizer: Dimensions of the weights in the model attributed to the output features:

Embedding_Dimension Weight Matrix–Size (1, 1)→ Generates a Value for Embedding Dimension in CLIM.

Nos_Layers Weight Matrix–Size (1, 1)→ Generates a Value denoting the Number of Fully Connected Layers in the CLIM.

Nos_Neurons Weight Matrix–Size (Nos_Layers, 1) Generates a Value for Number of Neurons in each Layer.

Nos_Epochs Weight Matrix–Size (1, 1) Generates a Value for Number of Epochs to be used for Training the CLIM.

Wherein, CLIM refers to code logic inference model

According to an embodiment of the disclosure, each of the logical block is sent into the capsule creation module 118, wherein the logical block is pre-processed into a set of capsules C={C1, C2 . . . Cn}. The set C represents the entire block into these capsules. Each capsule has 5 different parts: 1) Start Leaf Node, 2) Scope of Start Leaf Node, 3) Sequential Executional Distance between Start and the End Leaf Node, 4) Scope of End Leaf Node, and 5) End Leaf Node.

Figure 6:
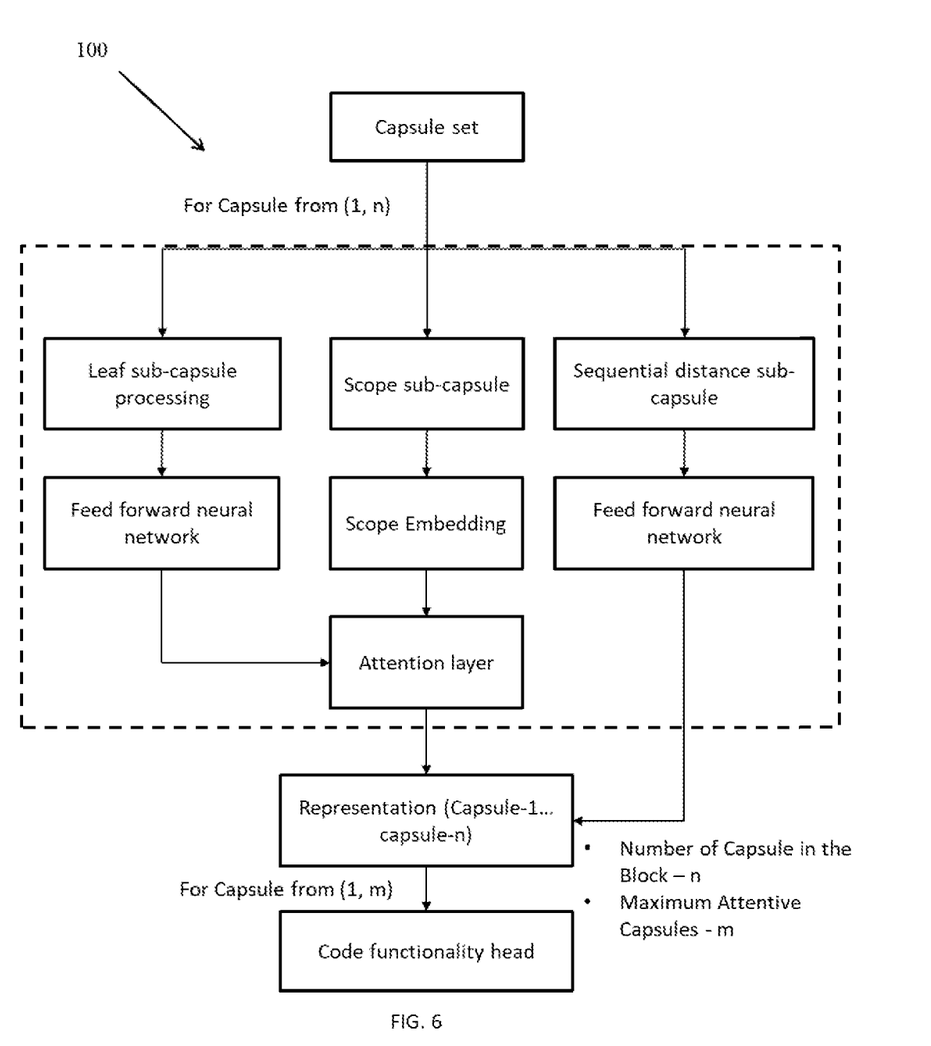
FIG. 6 is a block diagram illustrating a code functionality model of the system of FIG. 1 according to some embodiment of the present disclosure.

The code logic inference model is characterized into the following Modules as shown in FIG. 6. Feed forward network (Leaf): The feed forward network contains a set of feed forward layers wherein the input is the encoding of each leaf node (Start and End) to obtain the representation of each leaf sub-capsule. Path embedding: The scope based path information about each leaf node is given into the embedding layer which produces embedding for each scope sub-capsule. The Embedding is of the size which is product of length of the scope sub-capsule and the embedding dimension. Feed forward network (Sequential distance); This takes in the sequential distance sub-capsule as the input and gives out a representation based on the sequential path traced between start and end leaf nodes. Attention: This takes in feed forward networks (Leaf) output and path embedding concatenated into one vector. The concatenated vector is then given more attention based on the backpropagation of the training process. Code Functionality Head: The output of feed forward network (Sequential Distance) and the attention (concatenated together) passed into a set of feed forward layers makes a representation for each capsule.

According to an embodiment of the disclosure, the code functionality head expects each block to have uniform number of capsules. Based on the summed-attention of each capsule, capsule set of size n gets filtered to the most important set of capsules of size m. Wherein, m is the maximum attentive capsules based on summed-attention and n is always greater than or equal to m. These vectors are passed into code functionality head and classified.

Further at step 314, the functionality of the plurality of logical blocks is predicted by vectorizing the plurality of logical blocks using the plurality of capsules and the trained machine learning model, via the functionality prediction module 124. The trained machine learning module is used for predicting the functionality of the extracted code blocks and establish the functionality as shown in schematic diagram of FIG. 6.

Code functionality prediction: The outputs from the capsule creation module 118 and the model training module 122 act as an input to this phase. The plurality of logical blocks is further split into capsules based on the leaf nodes. These capsules are fed into a neural network where they go through the embedding, attention layer and classification stages based on the weights assigned by the pre-trained model. As an output of the neural network, code functionality classifications are achieved.

And finally at step 316, the predicted functionality of the plurality of logical blocks is merged with a plurality of external inputs to determine context specific code logic inference of the application source code, wherein the plurality of external inputs are taken from one or more external learning models.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of effectively getting inference out of the application source code. The embodiment thus provides the method and system for inferencing logic out of an application source code.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs etc.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a,","an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for inferencing logic out of an application source code, the method comprising:
providing, via a user interface, the application source code as an input; parsing, via one or more hardware processors, the application source code using parsers, wherein the parsing results in generation of a code language independent repository, and wherein the code language independent repository comprises information about the application source code;
linking, via the one or more hardware processors, the information related to each other present in the repository to extract a plurality of logical blocks of the application source code, wherein the plurality of logical blocks comprises a plurality of leaf nodes and sequential distances between each of the plurality of leaf nodes;

creating, via the one or more hardware processors, a plurality of capsules for each pair of the plurality of leaf nodes from the plurality of logical blocks based on a scope of the leaf nodes and sequential distance between the leaf nodes of each leaf node pair;

calculating, via the one or more hardware processors, an optimized set of hyper parameters of a machine learning model using an optimizer model;

training, via the one or more hardware processors, the machine learning model using the calculated hyper parameters;

predicting, via the one or more hardware processors, a functionality of the plurality of logical blocks by vectorizing the plurality of logical blocks using the plurality of capsules and the trained machine learning model; and merging, via the one or more hardware processors, the predicted functionality with a plurality of external inputs to determine code logic inference of the application source code, wherein the plurality of external inputs is taken from one or more external learning models.

2. The method of claim 1, wherein the plurality of capsules further comprises one or more of a plurality of leaf node sub-capsules, a plurality of scope sub-capsules, and a plurality of sequential distance sub-capsules.

3. The method of claim 1, wherein the plurality of logical blocks comprises one or more of a plurality of logically linked statements resulting in data blocks, control blocks and condition blocks, wherein a size of the plurality of logical block is determined through a set of optimum threshold.

4. The method of claim 1, wherein the parsing is performed using a plurality of technology specific parsers to understand a syntax of the application source code.

5. The method of claim 1, wherein the hyper parameters of the machine learning model are decided based on a desired accuracy, desired loss and base model architecture using the optimizer model.

6. The method of claim 1 further comprising retraining the machine learning model with additional input using the optimizer model.

7. A system for inferencing logic out of an application source code, the system comprising:
a user interface for providing, the application source code as an input;
one or more hardware processors; a memory in communication with the one or more hardware processors, wherein the one or more hardware processors are configured to execute programmed instructions stored in the memory, to:
  parse the application source code using parsers, wherein the parsing results in generation of a code language independent repository, wherein the code language independent repository comprises information about the application source code;
  link the information related to each other present in the repository to extract a plurality of logical blocks of the application source code, wherein the plurality of logical blocks comprising a plurality of leaf nodes and sequential distances between each of the plurality of leaf nodes;
  create a plurality of capsules for each pair of the plurality of leaf nodes from the plurality of logical blocks based on a scope of the leaf nodes and sequential distance between the leaf nodes of each leaf node pair;
  calculate an optimized set of hyper parameters of a machine learning model using an optimizer model;
  train the machine learning model using the calculated hyper parameters;
  predict a functionality of the plurality of logical blocks by vectorizing the plurality of logical blocks using the plurality of capsules and the trained machine learning model; and
  merge the predicted functionality with a plurality of external inputs to determine code logic inference of the application source code, wherein the plurality of external inputs is taken from one or more external learning models.

8. The system of claim 7, wherein the plurality of capsules further comprises one or more of a plurality of leaf node sub-capsules, a plurality of scope sub-capsules, and a plurality of sequential distance sub-capsules.

9. The system of claim 7, wherein the plurality of logical blocks comprises one or more of a plurality of logically linked statements resulting in data blocks, control blocks and condition blocks, wherein a size of the plurality of logical block is determined through a set of optimum threshold.

10. The system of claim 7, wherein the hyper parameters of the machine learning model are decided based on a desired accuracy, desired loss and base model architecture using the optimizer model.

11. A computer program product comprising a non-transitory computer-readable medium having a computer readable program embodied therein, wherein the computer readable program, when executed on a computing device, causes the computing device to:
parse the application source code using parsers, wherein the parsing results in generation of a code language independent repository, wherein the code language independent repository comprises information about the application source code;
link the information related to each other present in the repository to extract a plurality of logical blocks of the application source code, wherein the plurality of logical blocks comprising a plurality of leaf nodes and sequential distances between each of the plurality of leaf nodes;
create a plurality of capsules for each pair of the plurality of leaf nodes from the plurality of logical blocks based on a scope of the leaf nodes and sequential distance between the leaf nodes of each leaf node pair;
calculate an optimized set of hyper parameters of a machine learning model using an optimizer model;
train the machine learning model using the calculated hyper parameters;
predict a functionality of the plurality of logical blocks by vectorizing the plurality of logical blocks using the plurality of capsules and the trained machine learning model; and
merge the predicted functionality with a plurality of external inputs to determine code logic inference of the application source code, wherein the plurality of external inputs is taken from one or more external learning models.

* * * * *